United States Patent
Albal et al.

(10) Patent No.: US 6,570,969 B1
(45) Date of Patent: *May 27, 2003

(54) SYSTEM AND METHOD FOR CREATING A CALL USAGE RECORD

(75) Inventors: Nandakishore A. Albal, Naperville, IL (US); Janusz Hyziak, Des Plaines, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/613,377

(22) Filed: Jul. 11, 2000

(51) Int. Cl.[7] ............................................. H04M 15/00
(52) U.S. Cl. .................... 379/126; 379/229; 379/88.03; 379/115.01; 455/406; 455/563
(58) Field of Search ............................ 379/111, 112.01, 379/114.01, 121.01, 121.04, 114.28, 124, 126, 127.01, 115.01, 115.02, 116, 133, 134, 207.02, 207.04, 221.14, 114.03, 121.05, 129, 229, 230, 88.01, 88.03, 112.02; 455/405, 406, 407, 79, 563; 340/825, 825.36, 7.2

(56) References Cited

U.S. PATENT DOCUMENTS

| | | | | |
|---|---|---|---|---|
| 5,610,973 A | * | 3/1997 | Comer | 455/413 |
| 5,796,790 A | * | 8/1998 | Brunner | 455/406 |
| 5,875,238 A | * | 2/1999 | Glitho et al. | 379/114.28 |
| 5,940,756 A | * | 8/1999 | Sibecas et al. | 340/7.22 |
| 6,144,723 A | * | 11/2000 | Truchon et al. | 379/114.01 |
| 6,198,922 B1 | * | 3/2001 | Baynham | 455/429 |

* cited by examiner

*Primary Examiner*—Fan Tsang
*Assistant Examiner*—Roland G. Foster
(74) *Attorney, Agent, or Firm*—Hisashi D. Watanabe (57) ABSTRACT

A method of creating a call usage record is provided. An input signal is received. A call usage record is created in response to the received input signal. An event jacket is created. The event jacket is associated with the call usage record. A command to place a call is received. A confirmation signal is received after the call has been placed. Finally, a call leg jacket is created. The call leg jacket includes at least one record. The at least one record includes information relating to the call.

17 Claims, 3 Drawing Sheets

SYSTEM AND METHOD FOR CREATING A CALL USAGE RECORD

FIELD OF THE INVENTION

The present invention generally relates to communication systems, and, more particularly, to methods and systems for creating a call usage record.

BACKGROUND OF THE INVENTION

In today's communication environment, telephone calls are usually placed through a telecommunication network. When a telecommunication network detects a telephone call, a call detail record, which tracks the usage of services offered by the telecommunication carrier and records various details associated with the call, is created. Typically, the call detail record includes, for example, such items as the called number, the calling number, the date, the time, the duration of the call and other information relating to the call.

The call detail record may be stored in accordance with any one of a number of formats, such as, the Data Message Handling (DMH) standard. The DMH standard generally includes five data-containing jackets: an activity jacket, a call jacket, a segment jacket, an event jacket and a leg jacket. Activity jackets contain radio resource usage data, which may include, for example, the frequency on which a wireless device is operating. Call jackets contain a record of the type of services used during a call. Segment jackets contain a record of communication network facility usage data, including, for example, trunk group usage and switch identifier usage. Event jackets contain a record of the time and date the end user accessed the communication network, as well as an authorization identifier. Finally, leg jackets contain a record concerning the routing of the call.

However, the DMH standard typically records data concerning voice calls, and may not address other telephone services, including, for example, email services, paging services, end user-location detection services, content delivery services, and the services from other types of network elements. Further, call detail records are created after the call is terminated.

DETAILED DESCRIPTION OF THE PRESENTLY PREFERRED EMBODIMENTS

Figure 1:
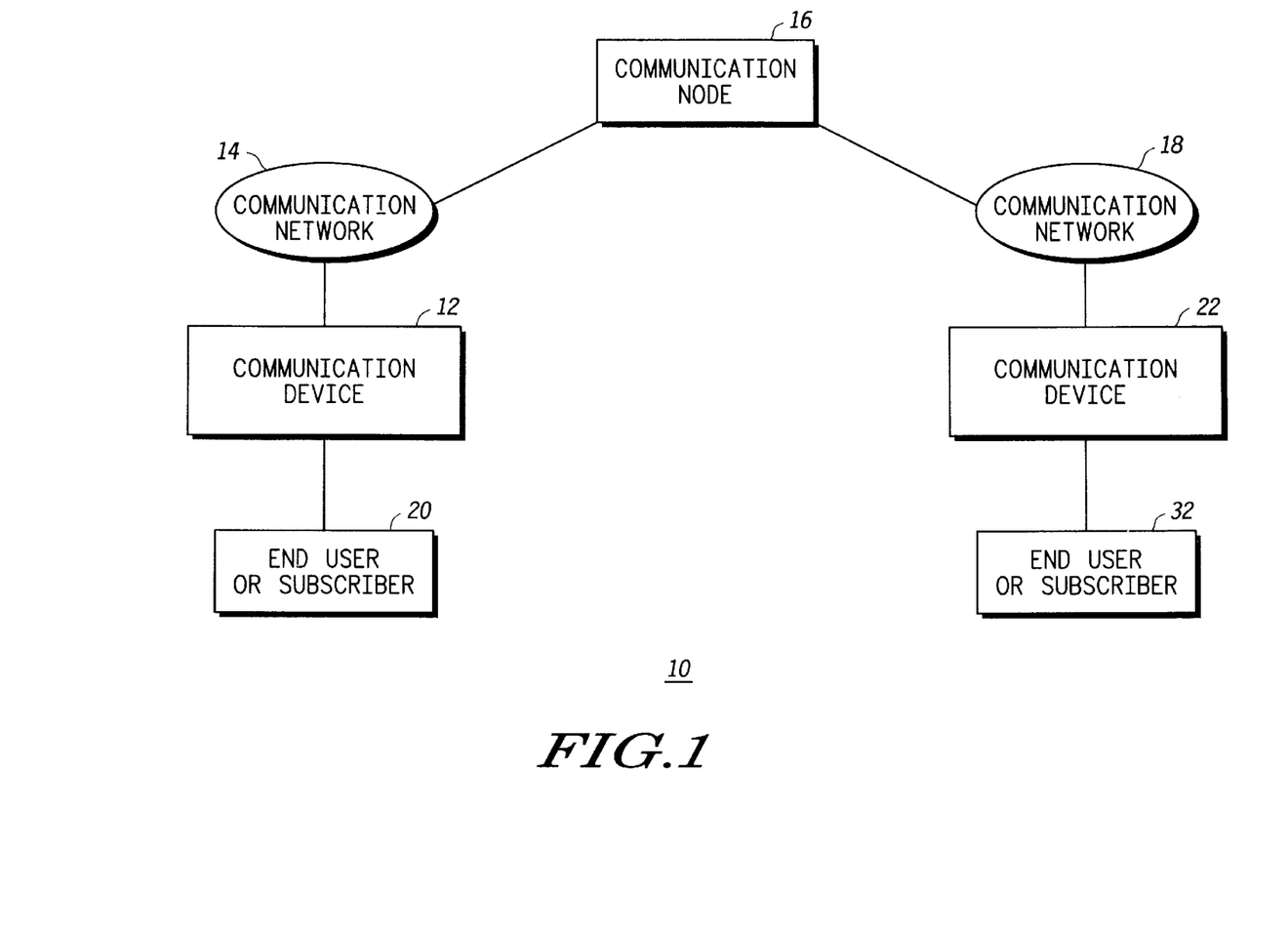
FIG. 1 is a block diagram of an embodiment of a communication system in accordance with the present invention.

FIG. 1 is a block diagram that illustrates an embodiment of a communication system 10. The communication system 10 generally includes one or more network access devices or communication devices 12, 22, communication networks 14, 18 and a communication node 16. As further described below, the communication system 10 can provide various services and capabilities to cellular end users, wire-line telephone end users, paging end users, satellite end users, mobile or portable telephone end users, trunked end users, computer network end users (e.g., Internet or Intranet end users), wireless data end users, branch office end users and the like. The communication system 10 can also create a call record for recording the details of a call, as further described below.

The communication devices 12, 22 of the communication system 10 can be utilized by end users 20, 32 to access and/or connect with the communication node 16. The communication devices 12, 22 can include, but are not limited to, wireline telephones, mobile telephones, paging units, radio units, wireless data devices, Web telephones, portable or wireless telephones, personal information managers (PIMs), personal digital assistants (PDAs), personal computers (PCs), network televisions (TVs), Internet TVs, Internet telephones, portable wireless devices (i.e., two-way pagers), security systems (both mobile and premises-based), workstations or any other suitable communication devices.

The communication devices 12, 22 communicate with the communication node 16 via the communication networks 14, 18. The communication networks 14, 18 can interface with the communication devices 12, 22 through wireline or wireless networks or systems (i.e., telephone or televisions systems, Integrated Services Digital Network (ISDN) systems, coaxial lines, computer networks, digital end user lines, private networks, wireless local loop systems, etc.).

The communication networks 14, 18 of the communication system 10 can include, but are not limited to, intranets, extranets, the Internet, a Local Area Network (LAN), a telephone network, (e.g., a Public Switched Telephone Network (PSTN), private telephone networks, etc.), a cellular network, satellite networks, a personal communication system, a TV network (e.g., a cable TV system), local, regional, national or global paging networks, an email system, a wireless data network (e.g., satellite data or local wireless data networks), a wireless LAN, a wireless local loop/distribution system (e.g., LMDS, MMDS or Code Division Multiple Access (CDMA) based system), a Voice Over Internet Protocol (VOIP) network, or any other suitable network. The communication networks 14, 18 can also include a wide area network (WAN), such as, for example, the Internet, the World Wide Web (WWW) or any other similar on-line service. It will be recognized that the communication networks 14, 18 may have portions in common, may comprise two separate networks, or may be the same network.

The communication node 16 of the communication system 10 can include, but is not limited to, an interactive voice response node, a server computer, the MIX™ platform and the Myosphere™ Service provided by Motorola, Inc. of Schaumburg, Ill. (as further described with reference to FIG. 4), or other suitable system. It will be recognized that the communication node 16 may be integrated within or may be remote from the communication networks 14, 18.

The communication node 16 records and maintains a call detail record, as well as a call usage record. The call usage record provides an accounting of each communication transaction performed by the end user within the communication system 10. For example, each time the end user accesses the communication node 16, the communication node 16 will record a call detail record. Preferably, each call usage record is stored within memory or a database, which may be located integral with or remote from the communication node 16.

Figure 2:
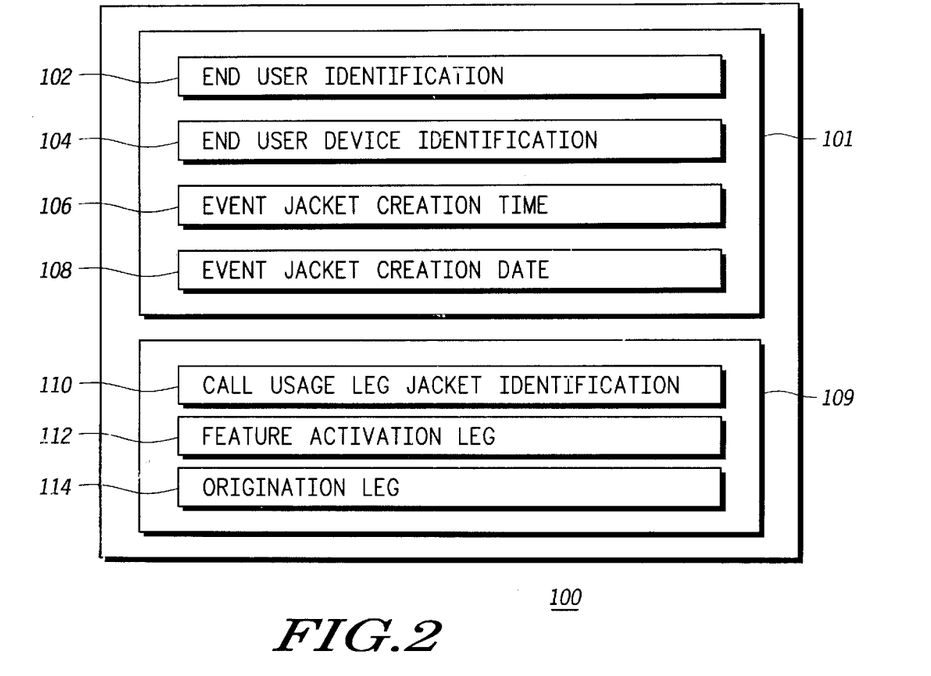
FIG. 2 is a depiction of a call usage record in accordance with the present invention.

FIG. 2 depicts a call usage record 100. The call usage record 100 is preferably comprised of a set of data-containing jackets, with each jacket including a number of records. Each record may include a number of sub-records, as further described below. The call usage record 100 may be compatible with any suitable standard, such as the DMH standard.

The call usage record 100 preferably includes an event jacket 101 and a call leg jacket 109. For example, the event jacket 101 and call leg jacket 109 may be compatible with the DMH standard, the Automatic Message Accounting standard, the Bellcore Account Format standard or any other suitable standard.

The event jacket 101 and the call leg jacket 109 may include a set of mandatory and/or optional parameters and fields depending on the operation of the communication system 10. The event jacket 101 preferably contains various information relating to the identity of the end user and the communication device, the time and/or date of the transaction, etc. It will be recognized that the event jacket 101 may contain any other suitable information. The call leg jacket 109 preferably includes the details of call transactions made by an end user, such as a call leg jacket identifier record, a feature activation leg record and an origination leg record. Thus, the call usage record 100 preferably contains an event jacket 101, and may contain, dependent upon the number of email transactions, one or more call leg jackets 109.

As shown in FIG. 2, the event jacket preferably includes an end user identification record 102, an end user number identification record 104, an event jacket creation time record 106 and an event jacket creation date record 108. The end user identification record 102 may be a record identifying the sender of the input signal, such as the end user. The end user identification record 102 may also indicate whether the end user is authorized to use the features and services of the communication system (i.e., whether the end user is a subscriber to the communication system). Preferably, the communication node compares the input signal with stored data concerning the end user. For example, the end user may be required to input a Personal Identification Number, a calling line identifier, a password or Internet "cookies" or tokens.

The end user device identification record 104 maintains and authenticates the number of the communication device from which the end user is calling. Preferably, the communication node performs a comparison between the number received in the input signal and the stored end user identification record. Upon finding a match, the communication node continues to create the call usage record 100. The event jacket creation time record 106 is preferably a record of the time at which the input signal was received at the communication node (which also coincides with the time of the creation of an email usage record 100).

The event jacket creation date record 108 preferably corresponds to the calendar date on which the input signal was received by the communication node (also coinciding with the creation of the call usage record 100). The communication node, when accessing an internal electronic clock, may create the event jacket creation time and date records 106, 108.

The call leg jacket 109 of the call usage record 100, which may include a link to the event jacket, preferably includes a number of records, such as, for example, a call leg jacket identifier record 110, a feature activation leg record 112, and an origination leg record 114. Preferably, the call leg jacket includes data collected from the instruction signal, the confirmation signal and the call itself.

The call usage leg jacket identifier record 110 preferably identifies the call leg jacket 109 as a call. Additionally, the call leg jacket identifier record 110 may include a link to the event jacket 101 of the current transaction. This link provides an organizational reference to the event jacket 101. As a result, if the call leg jacket 109 is stored in a location apart from the event jacket 101, there is an indication as to which transaction the call leg jacket 109 corresponds.

The feature activation leg record 112 preferably includes information relating to the establishment of the call. The feature activation leg record 112 may include a number of sub-records, including, for example, an identifier sub-record, which preferably identifies the feature activation leg record 112 as containing information about the call, including, for example, whether the telephone call is a non-voice call or whether the call is a second, or other ordinal, call placed within the same session with the communication node 16.

Additionally, the feature activation leg record 112 may include a dialed digits sub-record, a leg number sub-record, a called digits sub-record, a call history count sub-record, a calling digits sub-record, a conversation usage sub-record, a feature indicator sub-record, a feature operation sub-record, a feature result indicator sub-record, a last leg indicator, a bearer indicator sub-record, an interaction digits sub-record, an account code digits sub-record, and a related leg number sub-record.

The dialed digits sub-record preferably specifies the actual digits dialed by the end user. The leg number sub-record preferably specifies the number of the present leg jacket. This sub-record becomes important if the corresponding call is one of a number of multiple telephone calls. The called digits sub-record preferably specifies the identity of the called party intended by the calling party. This sub-record may be different than the dialed digits sub-record in the cases when number expansion (i.e., speed dialing) or number translation applies. The calling digits sub-record preferably specifies the identity of the calling party. The conversation usage sub-record preferably measures the conversation between answer and release. The feature indicator sub-record preferably defines the particular call feature accessed (i.e., paging, email, transaction, etc.). The feature operation sub-record preferably defines the operations of the particular call feature accessed. The feature result indicator sub-record preferably records the result of an access request to the particular call feature. Preferably, the details of a non-voice call are recorded in leg jackets specific to the type of call. The last leg indicator sub-record preferably indicates if the call is the last leg in a set of multiple calls. The bearer indicator sub-record preferably specifies the type of call (i.e., whether the call is a voice call or a multiple call, etc.). The interaction digits sub-record preferably records the digits entered in response to a voice or tone prompt. The account code digits sub-record preferably identifies the number that uniquely identifies the customer in the system (i.e., the "reach me" number). Finally, the related leg number sub-record preferably specifies the number of the call related to the total number of multiple calls (e.g., call 2 of 5).

The origination leg record 114 preferably comprises information relating to additional specifics concerning the call. The origination leg record 114 may include a number of sub-records also included in the feature activation leg record 112, including, for example, an identifier sub-record, a dialed digits sub-record, a leg number sub-record, an account code digits sub-record, a called digits sub-record, a call history count sub-record, a conversation usage sub-record, a last leg indicator sub-record, an interaction digits sub-record, and a related leg number sub-record.

Additionally, the origination leg record 114 may further include a billing indicator sub-record, a call serial sub-record, a destination digits sub-record, an IEC connect usage sub-record, an interaction digits sub-record, and an outgoing trunk usage sub-record.

The billing indicator sub-record preferably specifies the type of billing to be applied (e.g., invoice, collection, third party, etc.). The call serial number sub-record preferably identifies the call by recording the ESN of the call. The destination digits sub-record preferably is the number which the call is routed, which may be different than the called number when translation (i.e., speed dialing) or redirection is used. The Inter Exchange Carrier (IEC) connect usage sub-record preferably specifies details on the IEC connection, if used, during the call. Finally, the outgoing trunk usage sub-record preferably record the parameters pertaining to outgoing trunk usage.

Figure 3:
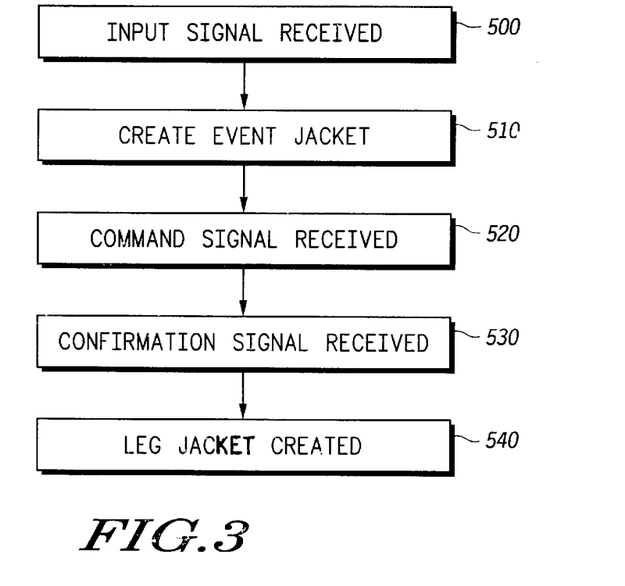
FIG. 3 is a flowchart of an embodiment of a call usage record creation routine in accordance with the present invention.

FIG. 3 illustrates an embodiment of a routine for creating a call usage record. At block 500, the communication node receives an input signal from the communication device. The input signal is preferably received when the end user accesses the calling services of the communication node, such as, for example, dialing into the communication node from a communication device. The input signal may include a telephone number, an Electronic Serial Number (ESN), a login name or password (as in the case of a PC), or any other presently known method of accessing the communication node.

Once the input signal is received at the communication node, a call usage record or event jacket is created at block 510. One example of an call usage record is shown in FIG. 2. The communication node preferably collects identification data from the input signal, such as the telephone number and the ESN, as well as from an internal electronic clock, and stores the identification information in the event jacket.

After creating the call usage record, the end user may perform a variety of tasks or transactions, which may include, for example, placing a call, preferably commenced by the reception of a command signal at a communication node at block 520. The communication node may receive the instruction signal from a communication device. For example, the end user may transmit a command message to the communication node instructing the communication node to place a call, such as, for example, "Call John Doe."

Alternatively, the communication node itself may generate the instruction signal. This may occur when, for example, the communication node is pre-programmed to place a call. For example, the end user may program the communication node to place a call at 6:00 a.m. tomorrow. In this case, the event jacket and the call leg jacket are created when the end user instructs or programs the communication node to perform such a transaction.

Once the communication node determines (or generates) a command signal, the communication node begins recording information to the call usage record. After the call has been placed, the communication node then receives a confirmation signal at block 530. The confirmation signal indicates that the call has been placed. The reception of the confirmation signal at the communication node will preferably trigger the communication node to complete the collection of data necessary to complete the call leg jacket at block 540.

Figure 4:
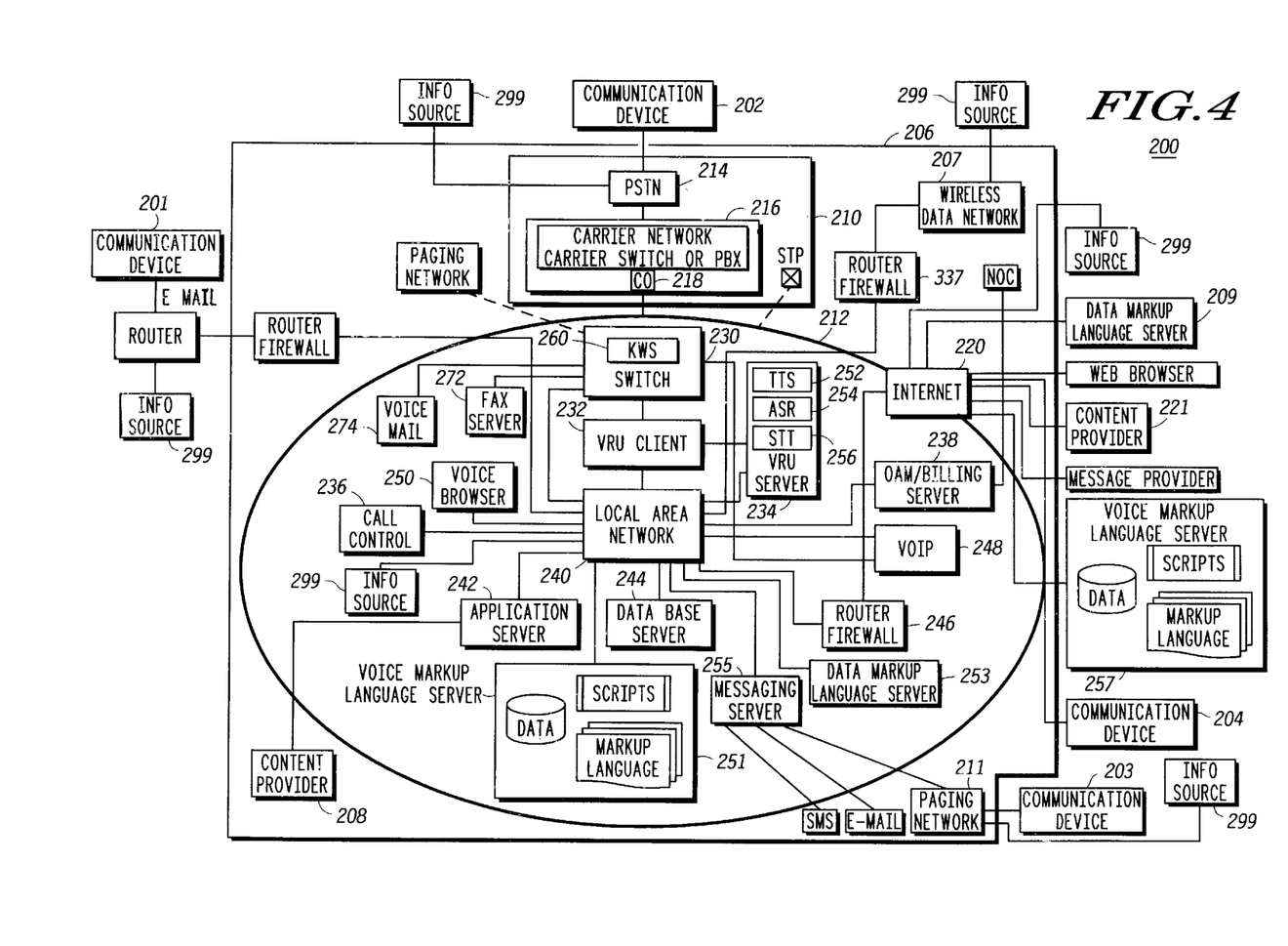
FIG. 4 is an exemplary block diagram of another embodiment of a communication system in accordance with the present invention.

Referring now to FIG. 4, an exemplary block diagram of another embodiment of a communication system 200 having the capability to create and maintain a call usage record is illustrated. The communication system can implement the routine described in FIG. 3 above.

The communication system 200 generally includes one or more communication devices 201, 202, 203, 204, 205 (five being shown), an electronic network 206, and one or more information sources (e.g., content providers 208, 221 (two being shown) and data and voice markup language servers 209, 251, 253, 257).

The end user can access the electronic network 206 by dialing a single direct access telephone number (e.g., a foreign exchange telephone number, a local telephone number, or a toll-free telephone number or PBX) from the communication device 201. The end user can also access the electronic network 206 from the communication device 202 via the Internet 220 or WWW, from the communication device 203 via a paging network 211, or from the communication device 205 via a LAN, a WAN, an email connection or in any other similar manner.

As shown in FIG. 4, the electronic network 206 includes a telecommunication network 210 and a communication node 212. The telecommunication network 210 is preferably connected to the communication node 212 via a high-speed data link, such as, for example, a T1 telephone line, a LAN, a WAN or a VOIP network. The telecommunication network 210 preferably includes a PSTN 214 and a carrier network 216. The telecommunication network 210 can also include, for example, international or local exchange networks, cable TV networks, inter-exchange carrier or long distance carrier networks, cellular networks (e.g., mobile switching centers), PBXs, satellite systems, wireless data networks and other switching centers such as conventional or trunked radio systems (not shown), etc. The electronic network 206 can also include additional telecommunication networks, such as, for example, a wireless data network 207.

The PSTN 214 can include various types of communication equipment, such as, for example, ATM networks, Fiber Distributed Data networks (FDDI), T1 lines, cable TV networks, VOIP networks and the like. The carrier network 216 generally includes a telephone switching system or central office 218.

It will be recognized that the carrier network 216 can be any suitable system that can route calls to the communication node 212, and the central office 218 can be any suitable wire-line or wireless switching system.

The communication node 212 is preferably configured to receive and process incoming calls from the carrier network 216 and the Internet 220. The communication node 212 can receive and process pages from the paging network 211 and can also receive and process messages (e.g., emails) from the LAN, WAN, wireless data or email system 213.

When an end user dials into the electronic network 206 from the communication device 201, the carrier network 216 routes the incoming call from the PSTN 214 to the communication node 212 over one or more telephone lines or trunks. The incoming calls preferably enter the carrier network 216 through one or more "888" or "800" Inward Wide Area Telecommunications Services trunk lines, local exchange or long distance trunk lines. It is also contemplated that the incoming calls can be received from a cable, cellular or VOIP network or any other suitable system.

The communication node 212 answers the incoming call from the carrier network 216 and retrieves an appropriate announcement (e.g., a welcome greeting) from a database, server or browser. The communication node 212 then plays the announcement to the caller. In response to audio inputs from the end user, the communication node 212 retrieves information from a destination or database of one or more of the information sources, such as the content providers 208, 221 or the markup language servers 209, 251, 253, 257. After the communication node 212 receives the information, it provides a response to the end user based upon the retrieved information.

The communication node 212 can provide various dialog voice personalities (e.g., a female voice, a male voice, etc.), and can implement various grammars (e.g., vocabulary) to detect and respond to the audio inputs from the end user. In addition, the communication node 212 can automatically select various speech recognition models (e.g., English, Spanish or English accent models) based upon an end user's profile, communication device and/or speech patterns. The communication node 212 can also allow the end user to select a particular speech recognition model.

When an end user accesses the electronic network 206 from a communication device 201, 202, 203, 204, 205 registered with the system (e.g., home telephone, work telephone, cellular telephone, etc.), the communication node 212 can by-pass an end user screening option and automatically identify the end user (or the type of communication device) through the use of ANI or CLI. After the communication node 212 verifies the call, the communication node 212 provides a greeting (e.g., "Hi, this is your personal agent, Maya. Welcome Bob. How may I help you?"). The communication node 212 then enters into a dialogue with the end user, and the end user can select a variety of services offered by the communication node 212.

When the end user accesses the electronic network 206 from a communication device not registered with the system (e.g., a payphone, a telephone of a non-end user, etc.), the communication node 212 answers the call and prompts the end user to enter his or her name and/or a personal identification number (PIN) using voice commands or DTMF signals. The communication node 212 can also utilize speaker verification to identify the particular speech pattern of the end user. If the communication node 212 authorizes the end user to access the system, the communication node 212 provides a personal greeting to the end user (e.g., "Hi, this is your personal agent, Maya. Welcome Ann. How may I help you?").

The communication node 212 then enters into a dialogue with the end user, and the end user can select various services offered by the communication node 212. If the name and/or PIN of the end user cannot be recognized or verified by the communication node 212, the end user will be routed to a customer service representative.

Once the end user has accessed the communication system 200, the end user may implement a wide variety of services and features by using voice commands, such as, for example, voice dialing, voice paging, facsimiles, caller announcements, voice mails, reminders, call forwarding, call recording, content information (e.g., newspapers, etc.), read email, read calendars, read "to-do" lists, banking, e-commerce. The communication system 200 can place outbound calls and pages to business and personal parties or contacts (e.g., friends, clients, business associates, family members, etc.) in response to DTMF signals or voice commands. The calls can be routed through a telephone or electronic network to the selected party and the pagers can be sent to a selected party via a paging system. The communication system 200 can also receive calls routed through a telephone or electronic network.

As shown in FIG. 4, the communication node 212 preferably includes a telephone switch 230, a voice or audio recognition (VRU) client 232, a VRU server 234, a controller or call control unit 236, an Operation and Maintenance Office or a billing server unit 238, a LAN 240, an application server unit 242, a database server unit 244, a gateway server or router firewall server unit 246, a VOIP unit 248, a voice browser 250, a voice markup language server 251, a messaging server 255 and a data markup language server 253. Although the communication node 212 is shown as being constructed with various types of independent and separate units or devices, the communication node 212 can be implemented by one or more integrated circuits, microprocessors, microcontrollers or computers which may be programmed to execute the operations or functions equivalent to those performed by the devices or units shown. It will also be recognized that the communication node 212 can be carried out in the form of hardware components and circuit designs and/or software or computer programs.

The communication node 212 can be located in various geographic locations throughout the world or the United States (e.g., Chicago, Ill.). The communication node 212 can be operated by one or more carriers (e.g., Sprint, Qwest, MCI, etc.) or independent service providers (e.g., Motorola, Inc.).

The communication node 212 can be integrated with the carrier network 216 or can be located remote from the carrier network 216. It is also contemplated that the communication node 212 may be integrated into a communication device, such as, for example, a wire-line or wireless telephone, a radio device, a PC, a PDA, a PIM, etc., and can be programmed to connect or link directly to an information source.

The communication node 212 can also be configured as a standalone system to allow end users to dial directly into the communication node 212 via a direct access telephone number. In addition, the communication node 212 may comprise a telephony switch (e.g., a PBX or Centrix unit), an enterprise network or a LAN. In this configuration, the communication system 200 can be implemented to automatically connect an end user to the communication node 212 when the end user accesses a communication device.

When the telephone switch 230 receives an incoming call from the carrier network 216, the call control unit 236 sets up a connection in the telephone switch 230 to the VRU client 232. The communication node 212 then enters into a dialog with the end user regarding various services and functions. The VRU client 232 preferably generates prerecorded voice announcements and/or messages to prompt the end user to provide inputs to the communication node 212 using voice commands or DTMF signals. In response to the inputs from the end user, the communication node 212 retrieves information from a destination of one of the information sources and provides outputs to the end user.

The telephone switch 230 is preferably connected to the VRU client 232, the VOIP unit 248 and the LAN 240. The telephone switch 230 receives incoming calls from the carrier network 216. The telephone switch 230 also receives incoming calls from the communication device 202 routed over the Internet 220 via the VOIP unit 248. The telephone switch 230 also receives messages and pages from communication devices 203, 205, respectively. The telephone switch 230 is preferably a digital cross-connect switch, Model LNX, available from Excel Switching Corporation, Hyannis, Mass. It will be recognized that the telephone switch 230 can be any suitable switch.

The VRU client 232 is preferably connected to the VRU server 234 and the LAN 240. The VRU client 232 processes voice communications, DTMF signals, pages and messages (e.g., emails). Upon receiving voice communications, the VRU client 232 routes the speech communications to the VRU server 234. When the VRU client 232 detects DTMF signals, it sends a command to the call control unit 236. It will be recognized that the VRU client 232 can be integrated with the VRU server 234.

The VRU client 232 preferably comprises a PC, such as, for example, a Windows NT compatible PC, with hardware capable of connecting individual telephone lines directly to the telephone switch 230 or carrier network 216. The VRU client 232 preferably includes a microprocessor, random access memory, read-only memory, a T1 or ISDN interface board, and one or more voice communication processing boards (not shown). The voice communication processing boards are preferably Dialogic boards, Antares Model, available from Dialogic Corporation, Parsippany, N.J. The voice communication boards may include a voice recognition engine having a vocabulary for detecting a speech pattern. The voice recognition engine is preferably a RecServer software package, available from Nuance Communications, Menlo Park, Calif.

The VRU client 232 can also include an echo canceler (not shown) to reduce or cancel TTS or playback echoes transmitted from the PSTN 214 due to hybrid impedance mismatches. The echo canceler is preferably included in an Antares Board Support Package, also available from Dialogic.

The call control unit 236 is preferably connected to the LAN 240, and sets up the telephone switch 230 to connect incoming calls to the VRU client 232. The call control unit 236 also sets up incoming calls or pages to the communication node 212 over the Internet 220 and pages and messages sent from the communication devices 203, 205 via the paging network 211 and email system 213, respectively. The control call unit 236 preferably comprises a PC, such as, for example, a Windows NT compatible PC.

The LAN 240 allows the various components and devices of the communication node 212 to communicate with each other via twisted pair, fiber optic, coaxial cables or the like. The LAN 240 may use Ethernet, Token Ring or other suitable types of protocols. The LAN 240 is preferably a 100 Megabit per second Ethernet switch, available from Cisco Systems, San Jose, Calif., and can comprise any suitable network system. The communication node 212 may include a plurality of LANs.

The VRU server 234 is connected to the VRU client 232 and the LAN 240. The VRU server 234 receives voice communications from the end user via the VRU client 232. The VRU server 234 processes the voice communications and compares the voice communications against a vocabulary or grammar stored in the database server unit 244 or a similar memory device.

The VRU server 234 provides output signals, representing the result of the voice communications processing, to the LAN 240. The LAN 240 routes the output signal to the call control unit 236, the application server unit 242 and/or the voice browser 250. The communication node 212 then performs a specific function associated with the output signals.

The VRU server 234 preferably includes a TTS unit 252, an automatic speech recognition (ASR) unit 254, and a STT unit 256. The TTS unit 252 receives textual data or information (e.g., email, web pages, documents, files, etc.) from the application server unit 242, the database server unit 244, the call control unit 236, the gateway server unit 246, the application server unit 242 and the voice browser 250. The TTS unit 252 processes the textual data and converts the data to voice data or information.

The TTS unit 252 can provide data to the VRU client 232, which reads or plays the data to the end user. For example, when the end user requests information (e.g., news updates, stock information, traffic conditions, etc.), the communication node 212 retrieves the desired data (e.g., textual information) from a destination of the one or more of the information sources and converts the data via the TTS unit 252 into a response.

The response is then sent to the VRU client 232. The VRU client 232 processes the response and reads an audio message to the end user based upon the response. It is contemplated that the VRU server 234 can read the audio message to the end user using human recorded speech or synthesized speech. The TTS unit 252 is preferably a TTS 2000 software package, available from Lernout and Hauspie Speech Product NV, Burlington, Mass.

The ASR unit 254 provides speaker dependent or independent automatic voice recognition of voice communications from the end user. It is contemplated that the ASR unit 254 can include speaker dependent voice recognition. The ASR unit 254 processes the voice communications to determine whether a word or a speech pattern matches any of the grammars or vocabulary stored in the database server unit 244 or downloaded from the voice browser 250. When the ASR unit 254 identifies a selected speech pattern of the voice communications, the ASR unit 254 sends an output signal to implement the specific function associated with the recognized speech pattern. The ASR unit 254 is preferably a speaker independent voice recognition software package, RecServer Model, also available from Nuance Communications. It is contemplated that the ASR unit 254 can be any suitable voice recognition unit to detect voice communications.

The STT unit 256 receives voice communications and converts the voice communications to textual information (e.g., a text message). The textual information can be sent or routed to the communication devices 201, 202, 203, 204, 205, the content providers 208, 221, the markup language servers 209, 251, 253, 257, the voice browser 250 and the application server unit 242. The STT unit 256 is preferably a Naturally Speaking software package, available from Dragon Systems, Newton, Mass.

The VOIP unit 248 is preferably connected to the telephone switch 230 and the LAN 240. The VOIP unit 248 allows an end user to access the communication node 212 via the Internet 220 or VOIP public network using voice commands. The VOIP unit 248 can receive VOIP protocols (e.g., H.323 protocols) transmitted over the Internet 220 or Intranet, and can convert the VOIP protocols to voice information or data. The voice information can then be read to the end user via the VRU client 232.

The VOIP unit 248 can also receive voice communications from the end user and convert the voice communications to a VOIP protocol that can be transmitted over the Internet 220. The VOIP unit 248 is preferably a Voice Net software package, also available from Dialogic Corporation. It will be recognized that the VOIP unit 248 can be incorporated into a communication device.

The communication node 212 also includes a detection unit 260. The detection unit 260 is preferably a phrase or key word spotter unit, detecting incoming audio inputs or communications or DTMF signals from the end user. The detection unit 260 is preferably incorporated into the telephone switch 230, but can be incorporated into the VRU client 232, the carrier network 216 or the VRU server 234. The detection unit 260 is preferably included in a RecServer software package, also available from Nuance Communications.

The detection unit 260 records the audio inputs from the end user and compares the audio inputs to the vocabulary or grammar stored in the database server unit 244. The detection unit 260 continuously monitors the end user's audio inputs for a key phase or word after the end user is connected to the node 212. When the detection unit 260 detects the key phrase or word, the VRU client 232 plays a pre-recorded message to the end user. The VRU client 232 then responds to the audio inputs provided by the end user.

The billing server unit 238 is preferably connected to the LAN 240. The billing server unit 238 can record data about the use of the communication node 212 by an end user (e.g., length of calls, features accessed by the end user, etc.). Upon completion of a call by an end user, the call control unit 236 sends data to the billing server unit 238. The billing server unit 238 can subsequently process the data in order to prepare customer bills. The billing server unit 238 can use the ANI or CLI of the communication device to properly bill the end user. The billing server unit 238 preferably comprises a Windows NT compatible PC.

The gateway server unit 246 is preferably connected to the LAN 240 and the Internet 220. The gateway server unit 246 provides access to the content provider 221 and the voice markup language server 257 via the Internet 220. The gateway server unit 246 allows end users to access the communication node 212 from the communication device 202 via the Internet 220. The gateway server unit 246 can function as a firewall to control access to the communication node 212 to authorized end users. The gateway server unit 246 is preferably a Cisco Router, also available from Cisco Systems.

The database server unit 244 is preferably connected to the LAN 240. The database server unit 244 preferably includes a plurality of storage areas to store data relating to end users, such as, for example, speech vocabularies, dialogs, personalities, end user entered data, and other information. Preferably, the database server unit 244 stores a personal file or address book. The personal address book can contain information required for the operation of the communication system 200, including end user reference numbers, personal access codes, personal account information, contact's addresses, telephone numbers, etc. The database server unit 244 is preferably a PC, such as, for example, a Windows NT compatible PC.

The application server unit 242 is preferably connected to the LAN 240 and the content provider 208. The application server unit 242 allows the communication node 212 to access information from a destination of the information sources, such as the content providers 208, 221 and the markup language servers 209, 251, 253, 257. For example, the application server unit 242 can retrieve information (e.g., weather reports, stock information, traffic reports, restaurants, flower shops, banks, calendars, "to-do" lists, e-commerce, etc.) from a destination of the information sources. This application server unit 242 may include Starfish Software to provide the address book, calendar and to-do lists, and to allow the end user to organize information. The application server unit 242 processes the retrieved information and provides the information to the VRU server 234 and the voice browser 250. The VRU server 234 can provide an audio announcement to the end user based upon the information using TTS synthesizing or human recorded voice. The application server unit 242 can also send tasks or requests (e.g., transactional information) received from the end user to the information sources (e.g., a request to place an order for a pizza). The application server unit 242 can further receive end user inputs from the VRU server 234 based upon a speech recognition output. The application server unit 242 is preferably a PC.

The voice markup language server 251 is preferably connected to the LAN 240. The voice markup language server 251 can include a database, scripts and markup language documents or pages. The voice markup language server 251 is preferably a PC, such as, for example, a Windows NT compatible PC. It will also be recognized that the voice markup language server 251 can be an Internet server (e.g., a Sun Microsystems server).

The messaging server 255 is preferably connected to the LAN 240, the paging network 211, an email system 213 and a short message system (SMS) 290. The messaging server 255 routes pages between the LAN 240 and the paging network 211. The messaging server 255 is preferably a PC, such as, for example, a Windows NT compatible PC. The messaging server 255 can also provide direct storage. It is contemplated that the messaging server 255 can reside externally from the communication node 212.

The voice browser 250 is preferably connected to the LAN 240. The voice browser 250 preferably receives information from the markup language servers 209, 251, 253, 257, the database server unit 244 and the content providers 208, 221. In response to voice commands or DTMF signals, the voice browser 250 generates a content request (e.g., an electronic address) to navigate to a destination of one or more of the information sources. The content request can use at least a portion of a Uniform Resource Locator, an Internet Protocol, a page request, or email.

After the voice browser 250 is connected to an information source, the voice browser 250 preferably uses a Transmission Control Protocol/Internet Protocol connection to pass requests to the information source. The information source responds to the requests, sending at least a portion of the requested information, represented in electronic form, to the voice browser 250. The information can be stored in a database, and can include text content, markup language document or pages, non-text content, dialogs, audio sample data, recognition grammars, etc. The voice browser 250 then parses and interprets the information, further described below. The voice browser 250 can be integrated into the communication devices 201, 202, 203, 204, 205.

As shown in FIG. 4, the content provider 208 is connected to the application server unit 242 of the communication node 212, and the content provider 221 is connected to the gateway server unit 246 of the communication node 212 via the Internet 220. The content providers 208, 221 can store various content information, such as, for example, news, banking, commerce, weather, traffic conditions, etc. The content providers 208, 221 can include a server to operate WWW pages or documents in the form of a markup language. The content providers 208, 221 can also include a database, scripts and/or markup language documents or pages. The scripts can include images, audio, grammars, computer programs, etc. The content providers 208, 221 execute suitable server software to send requested information to the voice browser 250.

The voice mail unit 274 is preferably connected to the telephone switch 203 and the LAN 240. The voice mail unit 274 can store voice mail messages from parties trying to send messages to the communication node 212. When an end user accesses the electronic network 206, the voice mail unit 274 can notify the end user of new and stored messages. The end user can access the messages to play, delete, store and forward the messages. When the end user accesses a message, the message can be read to the end user or can be displayed as textual information on a communication device (e.g., a pager, a SMS 290, or a PDA, etc.). The end user can also access and operate external messages or mail systems remote from the electronic network 206.

The FAX server unit 272 is preferably connected to the telephone switch 230 and the LAN 240. The FAX server unit 272 receivers and stores facsimile information sent via the electronic network 206 or the carrier network 216. Subscribers can access the facsimile information to play, store, delete, and forward the information. The facsimile information can be read via the TTS unit 252 or can be displayed as textual information on a suitable communication device. The FAX server unit 272 preferably comprises a PC, such as, for example, a Windows NT compatible PC or a Dialogue Fax Server.

Further information regarding communication system 200 is disclosed in U.S. patent application Ser. No. 09/141,485, entitled Telecommunication System and Methods Therefor, filed Aug. 27, 1998, the entire disclosure of which is incorporated herein.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A method of creating a call usage record comprising:
   receiving an input signal;
   creating a call usage record in response to the input signal;
   creating an event jacket associated with the call usage record;
   receiving a command to place a call after creating the call usage record;
   receiving a confirmation signal after the call has been placed; and
   creating a call leg jacket including at least one record, the at least one record including information collected from input signal, the confirmation signal and the call.

2. The method of claim 1, wherein the input signal is received from a communication device.

3. The method of claim 2, wherein the communication device includes one of a telephone, a paging unit, a cellular telephone, a satellite telephone, an Internet telephone. and a personal computer.

4. The method of claim 1, wherein the input signal is received at a communication node from a communication device.

5. The method of claim 1, wherein the input signal is generated by a communication node.

6. The method of claim 1, wherein the confirmation signal is received at a communication node.

7. The method of claim 1, wherein the event jacket includes at least one of an end user identification record, an end user device identification record, a first time record and a first date record.

8. The method of claim 1, wherein the call leg jacket includes at least one of an identifier record, a feature activation leg record and an origination leg record.

9. A system for creating a call usage record comprising:
   computer readable program code to receive an input signal;
   computer readable program code to create a call usage record in response to the input signal;
   computer readable program code to receive a request to place a call corresponding to the call usage record after the call usage record is created;
   computer readable program code to receives a confirmation signal after the call has been placed; and
   computer readable program code to creates a call leg jacket including at least one record, the at least one record including information collected from input signal, the confirmation signal and the call.

10. The system of claim 9, wherein the input signal is received from a communication device.

11. The system of claim 10, wherein the communication device includes one of a telephone, a paging unit, a cellular telephone, a satellite telephone, an Internet telephone and a personal computer.

12. The system of claim 9, wherein the input signal is received at a communication node from a communication device.

13. The system of claim 9, wherein the input signal is generated by a communication node.

14. The system of claim 9, wherein the confirmation signal is received at a communication node.

15. The system of claim 9, wherein the event jacket includes at least one of an end user identification record, an end user device identification record, a first time record and a first date record.

16. The method of claim 9, wherein the call usage leg jacket includes at least one of an identifier record, a feature activation leg record and an origination leg record.

17. A program for creating a call usage record comprising:
   computer readable program code to receive an input signal;
   computer readable program code to create a call usage record in response to the input signal;
   computer readable program code to receive a request to place a call corresponding to the call usage record after the call usage record is created;
   computer readable program code to receives a confirmation signal after the call has been placed; and
   computer readable program code to creates a call leg jacket including at least one record, the at least one record including information collected from input signal, the confirmation signal and the call.

* * * * *